United States Patent
Xu et al.

(10) Patent No.: US 11,540,537 B2
(45) Date of Patent: Jan. 3, 2023

(54) LYCOPENE COLORANT HAVING FRESH-KEEPING FUNCTION, PREPARATION METHOD THEREFOR AND APPLICATION THEREOF

(71) Applicant: Chenguang Biotech Group Co., Ltd., Hebei (CN)

(72) Inventors: Jianzhong Xu, Hebei (CN); Xinchao Jia, Hebei (CN); Hong Tian, Hebei (CN); Wei Gao, Hebei (CN); Hongxia Wang, Hebei (CN); Lijuan Jiao, Hebei (CN)

(73) Assignee: Chenguang Biotech Group Co., Ltd., Hebei (CN)

( * ) Notice: Subject to any disclaimer, the term of this patent is extended or adjusted under 35 U.S.C. 154(b) by 270 days.

(21) Appl. No.: 16/915,177

(22) Filed: Jun. 29, 2020

(65) Prior Publication Data
US 2020/0329747 A1    Oct. 22, 2020

Related U.S. Application Data

(63) Continuation of application No. PCT/CN2017/120198, filed on Dec. 29, 2017.

(51) Int. Cl.
| | | |
|---|---|---|
| *A61K 36/00* | (2006.01) | |
| *A23L 5/44* | (2016.01) | |
| *C09B 61/00* | (2006.01) | |
| *C09B 67/10* | (2006.01) | |

(52) U.S. Cl.
CPC .............. *A23L 5/44* (2016.08); *C09B 61/00* (2013.01); *C09B 67/0014* (2013.01); *A23V 2002/00* (2013.01)

(58) Field of Classification Search
CPC .............. A23V 2250/213; A23V 2250/6406
See application file for complete search history.

(56) References Cited

U.S. PATENT DOCUMENTS

6,261,622 B1    7/2001   Koguchi et al.

FOREIGN PATENT DOCUMENTS

| CN | 1053949 | 8/1991 | | |
|---|---|---|---|---|
| CN | 1653949 | 8/2005 | | |
| CN | 104621230 | 5/2015 | | |
| CN | 106344510 | 1/2017 | | |
| CN | 106344510 A | * 1/2017 | ............. | A61K 31/01 |
| CN | 107411076 | 12/2017 | | |
| JP | 1998509590 | 9/1998 | | |
| JP | 1999322628 | 11/1999 | | |
| JP | 2002272425 | 9/2002 | | |
| JP | 2006191927 | 7/2006 | | |
| JP | 2008063476 | 3/2008 | | |
| JP | 2009209116 | 9/2009 | | |
| WO | WO 2016/007720 | 1/2016 | | |
| WO | WO 2019/127485 | 7/2019 | | |

* cited by examiner

*Primary Examiner* — Qiuwen Mi
(74) *Attorney, Agent, or Firm* — Levine Bagade Han LLP

(57) ABSTRACT

Disclosed is a lycopene food colorant having a fresh-keeping function. The food colorant is prepared from the following raw materials in parts by weight: 1-3 parts of a lycopene crystal, 5-20 parts of an emulsifier, 0.5-5 parts of an antioxidant, 60-70 parts of glycerol, and 10-20 parts of water. The food colorant is prepared by mixing the raw materials and then emulsifying and grinding same. The granularity of the obtained lycopene colorant is moderate; the tone is suitable for coloring a minced fillet product; the lycopene colorant has high tinting strength, achieves a bright color, and has the effect of triggering myoglobin, so that the minced fillet product has a bright color and appears fresher; the lycopene colorant further has a fresh-keeping function and can kill some food microorganisms, so as to keep food fresh and prolong the shelf life.

18 Claims, No Drawings

LYCOPENE COLORANT HAVING FRESH-KEEPING FUNCTION, PREPARATION METHOD THEREFOR AND APPLICATION THEREOF

CROSS-REFERENCE TO RELATED APPLICATIONS

This application is a continuation of International Patent Application Number PCT/CN2017/120198 filed Dec. 29, 2017, the content of which is incorporated herein by reference in its entirety.

TECHNICAL FIELD

The present invention relates to the field of food industry, in particular to a lycopene colorant having fresh-keeping function and preparation method thereof.

BACKGROUND

Lycopene is one of carotenoids. Lycopene contains many double bonds in its molecule and has very strong antioxidative activity. It can avoid the oxidative damage to cells and prevent the occurrence of cancer. Moreover, lycopene can also prevent the occurrence of cardio-cerebrovascular diseases, and has the function such as aging delaying.

Lycopene is a fat-soluble red pigment. When applied to the surface of foods such as meat products, lycopene can not only brighten the color of fresh meat, but also exhibit the functions of moisturizing and fresh-keeping, thereby prolonging the shelf life of products. However, due to the water-insolubility of lycopene, the application of lycopene in foods has been greatly restricted.

Minced fillet products such as crab sticks need to be color coated during processing, wherein a red pigment similar to the color of shrimps and crabs is selected and coated on the surface of the rolls of the products, so as to improve the color of the crab sticks. The natural red pigments currently used for crab sticks include cochineal red pigment, Monascus red pigment and the like, but these red pigments generally have color-protecting effect only, and exhibit poor fresh keeping effect.

Chinese patent document No. CN104621230A discloses a fresh-keeping and color-protecting atomized agent for fresh foods such as chicken wings, pork, and beef. The atomized agent is mainly composed of chitosan, glycerol and lycopene, wherein by the emulsifying effect of glycerol on lycopene, lycopene can be dissolved in water to form an atomized agent which can further form a protective film on the surface of fresh meat, so as to reduce water evaporation, but the atomized agent is not effective in color protection. Chinese patent document No. CN1053949A discloses a water-soluble emulsified lycopene food colorant and preparation method thereof, but the product obtained by the technical solution has poor color generating effect when applied to minced fillet products.

At present, there is an urgent need to develop a lycopene food colorant with fine and uniform particles, and the functions of generation of bright color, water retention, permeation resistance, and fresh keeping.

SUMMARY OF THE INVENTION

The technical problem to be solved by the present invention is to overcome the defects of the prior art, and to provide a lycopene food colorant having a fresh-keeping function.

The colorant provided by the present invention has the characteristics of fine and uniform particles, bright color generation, good water retention effect, permeation resistance and the like.

Specifically, the food colorant provided by the present invention is prepared from raw materials including a lycopene crystal, an emulsifier, an antioxidant, glycerol, and water, wherein the core substance is the lycopene crystal.

Lycopene is a fat-soluble pigment which cannot be easily and directly absorbed by human body. Most of the lycopene commercial available at present is lycopene oleoresin with a content of lycopene of about 15%. If lycopene oleoresin is directly used to prepare a colorant, the color tone of the prepared colorant tends to be yellow. The present invention uses a lycopene crystal as a raw material to prepare a colorant with red tone, and thereby obtain a lycopene food colorant with fine and uniform particles, bright color generation, water retention, permeation resistance and fresh-keeping function. The lycopene crystal used in the present invention can be prepared by using lycopene oleoresin as a raw material and adding an organic solvent to recrystallize, or it can be directly purchased from the market.

In the present invention, by comprehensively optimizing the composition of each raw material, especially controlling the relative amount of glycerol and the relative amount of water in the raw materials, it can ensure that the colorant prepared by using the above-mentioned raw materials has desirable color tone, particle size and viscosity. Specifically, in the present invention, it is preferable that the raw materials comprise the following components: 1 to 3 parts of a lycopene crystal, 5 to 20 parts of an emulsifier, 0.5 to 5 parts of an antioxidant, 60 to 70 parts of glycerol, and 10 to 20 parts of water, based on parts by weight.

The emulsifier of the present invention is preferably obtained by mixing an oil-soluble emulsifier with a water-soluble emulsifier, and is preferably obtained by mixing an oil-soluble emulsifier with a water-soluble emulsifier at a mass ratio of (1-5):(5-15), so as to ensure that the emulsifier synergizes with specific proportions of glycerol and water to form a good vehicle for lycopene, thus allowing the colorant product to have excellent performance. The water-soluble emulsifier can be one or more selected from the conventional water-soluble emulsifiers in the art for use in foods, such as Tween, sucrose monostearate, and sucrose monopalmitate; and the oil-soluble emulsifier is selected from the conventional oil-soluble emulsifiers in the art for use in foods, such as phospholipid.

In the present invention, an antioxidant is added to the formulation to make the colorant have an antioxidative function. The antioxidant present in a specific proportion can synergize with the lycopene crystal, so that the colorant has a good fresh-keeping effect. The antioxidant can be one or more selected from food antioxidants commonly used in the art, such as L-ascorbic acid, tea polyphenol, and vitamin E.

As a preferred solution of the present invention, the raw materials comprise the following components: 1% to 3% of a lycopene crystal, 1% to 5% of an oil-soluble emulsifier, 5% to 15% of a water-soluble emulsifier, 0.5% to 5% of an antioxidant, 60% to 70% of glycerol, and water in balance, based on mass percentage.

The lycopene colorant provided by the present invention has desirable particle size, color tone and viscosity. Specifically, the median particle size $D_{50}$ of the food colorant provided by the present invention is 0.55 to 0.65 μm. The tone values of the food colorant provided by the present invention are L*25 to 35, a*30 to 35, and b*20 to 25

(wherein, L* represents black and white, when L* is 0, it represents black, when L* is 100, it represents white, and when L* is a value between 0 and 100, it represents gray; a* represents red and green, when a* is positive value, it represents red, and when a* is negative value, it represents green; and b* represents yellow and blue, when b* is positive value, it represents yellow, and when b* is negative value, it represents blue). The food colorant provided by the present invention has a viscosity of 20,000 to 40,000 mPa·s under the conditions of a temperature of 25° C. and a relative humidity of 60%.

The present invention also provides a preparation method of the food colorant. Specifically, the food colorant is obtained by mixing the raw materials, emulsifying and grinding.

The emulsification is carried out by a conventional emulsifying method in the art, as long as the raw materials can be emulsified to obtain an emulsified suspension. As a specific embodiment of the present invention, shear emulsification is performed under the condition of 6,000 to 8,000 rpm. In the present invention, the emulsification is preferably carried out at 45° C. to 75° C., and the emulsification time is preferably 15 to 45 min.

In the present invention, the emulsion obtained after emulsification is put into a grinder for grinding, so as to ensure that a product with a specific particle size, color tone and viscosity can be obtained. It has been found through a lot of practice in the present invention that the temperature control during grinding is the crucial for whether the product provided by the present invention has a desirable color tone and particle size. If the grinding temperature is higher than 60° C., the tone values can only reach a*12 to 15 and b*3 to 5 after the grinding, and the tone values will not increase even if the grinding continues, and thus products with bright red color cannot be obtained. If the grinding temperature is lower than 40° C., the viscosity of the emulsion suspension will increase, resulting in increased grinding resistance, and thus the grinding medium will suspend in the emulsion suspension, and the grinding effect cannot be achieved. Since the grinding process itself generates a large amount of heat which will raise the temperature of the product, the temperature control in the present invention refers to maintaining the temperature of the product during the grinding process within a specific range of 40° C. to 60° C. through temperature control. In the present invention, it is further preferred that the linear velocity of the grinding is 8 to 15 m/s, and the grinding time is 120 to 150 min.

During the preparation process, sampling can be performed every half an hour to detect the particle size and color tone, and when qualified, the product can be discharged and packaged to obtain the food colorant having a fresh-keeping function according to the present invention.

By using the above-mentioned method for preparing a colorant, the product can be provided with desirable particle size, color tone and viscosity, so as to ensure that the product has the characteristics of fine and uniform particles, bright color generation, good water retention effect, permeation resistance and the like.

The present invention also claims the use of the lycopene colorant in the preparation of a minced fillet food. The minced fillet is obtained by chopping and mixing fish, adding table salt, auxiliary materials and the like, grinding and blending to give a viscous fish paste, then shaping and heating to turn it into an elastic gel, such as fish balls, fish cakes, fish sausages, fish rolls and the like. Herein, the "minced fillet" is not limited to a product prepared from fish as the raw material, but also includes products made from aquatic products such as crabs, shrimps, and shellfish as raw materials, for example, crab sticks.

The use is specifically as follows: the lycopene colorant is diluted and sprayed on the surface of a minced fillet food. The dilution is preferably performed by diluting with purified water to 8 to 12 times the mass of the lycopene colorant. When the minced fillet food is a crab stick, preferably 3 to 7 g of the lycopene colorant is used per kg of the crab stick according to the present invention.

The lycopene colorant provided by the present invention has a moderate particle size, a color tone suitable for coloring a minced fillet product, high tinting strength and a bright color. The lycopene colorant provided by the present invention has the effect of triggering generation of myoglobin, so that the minced fillet product has a bright color and appears fresher. The lycopene colorant further has a fresh-keeping function and can kill some microorganisms in food, thereby keeping food fresh and prolonging the shelf life.

SPECIFIC MODES FOR CARRYING OUT THE EMBODIMENTS

The specific embodiment of the present invention will be further described in detail below in combination with specific Examples. The following Examples are used to illustrate the present invention, but not to limit the scope of the present invention.

The raw materials used in the following examples are all commercially available, wherein, the content of lycopene in the lycopene crystal (purchased from Chenguang Biotech Group Co., Ltd.) is 90% to 95%.

Example 1

The present Example provides a lycopene colorant prepared from the raw materials comprising the following components: 25 g of a lycopene crystal, 100 g of sucrose monostearate, 50 g of phospholipid, 5 g of vitamin E, 620 g of glycerol, and 200 g of water.

The present Example further provides a preparation method of the lycopene colorant, specifically comprising the following steps:

(1) the raw materials were mixed, added into an emulsification tank, heated to 45° C., and subjected to shear emulsification for 30 min under the condition of 6,000 rpm to obtain an emulsion suspension; and (2) the emulsion suspension was put into a grinder, and ground for 120 min at a grinding temperature controlled at 40° C., and a grinding linear speed of 12 m/s.

Testing results show that the $D_{50}$ of the lycopene food colorant provided in the present Example is 0.58 μm; the tone values are L*35, a*30, and b*20, respectively; and the viscosity of the colorant is 40,000 mPa·s at a temperature of 25° C. and a relative humidity of 60%.

Example 2

The present Example provides a lycopene colorant prepared from the raw materials comprising the following components: 300 g of a lycopene crystal, 1.1 kg of Tween 80, 100 g of phospholipid, 500 g of tea polyphenol, 7 kg of glycerol, and 1 kg of water.

The present Example further provides a preparation method of the lycopene colorant, specifically comprising the following steps:
(1) the raw materials were mixed, added into an emulsification tank, heated to 75° C., and subjected to shear emulsification for 15 min under the condition of 8,000 rpm to obtain an emulsion suspension; and
(2) the emulsion suspension was put into a grinder and ground for 150 min at a grinding temperature controlled at 50° C., and a grinding linear speed of 8 m/s.

Testing results show that the $D_{50}$ of the lycopene food colorant provided in the present Example is 0.65 µm; the tone values are L*30, a*32, and b*22, respectively; and the viscosity of the colorant is 35,000 mPa·s at a temperature of 25° C. and a relative humidity of 60%.

Example 3

The present Example provides a lycopene colorant prepared from the raw materials comprising the following components: 1 kg of a lycopene crystal, 15 kg of sucrose monopalmitate, 2.5 kg of phospholipid, 3 kg of ascorbic acid, 63.5 kg of glycerol, and 15 kg of water.

The present Example further provides a preparation method of the lycopene colorant, specifically comprising the following steps:
(1) the raw materials were mixed, added into an emulsification tank, heated to 60° C., and subjected to shear emulsification for 45 min under the condition of 7,000 rpm to obtain an emulsion suspension; and
(2) the emulsion suspension was put into a grinder and ground for 120 min at a grinding temperature controlled at 60° C., and a grinding linear speed of 15 m/s.

Testing results show that the $D_{50}$ of the lycopene food colorant provided in the present Example is 0.55 µm; the tone values are L*25, a*35, and b*25, respectively; and the viscosity of the colorant is 20,000 mPa·s at a temperature of 25° C. and a relative humidity of 60%.

Comparative Example 1

A lycopene colorant was prepared using the formulation disclosed in Example 1 of Chinese Patent Document No. CN1053949A. The specific formulation comprises the following components: 1 kg of lycopene oleoresin with a lycopene content of 10%, 100 g of soybean phospholipid, 4.9 kg of glycerol, and 3 kg of water.

The specific preparation method is the same as that in Example 1.

Testing results show that the $D_{50}$ of the lycopene food colorant provided in the present Comparative Example is 1.3 µm; the tone values are L*38, a*15, and b*32, respectively; and the viscosity of the colorant is 8,000 mPa·s at a temperature of 25° C. and a relative humidity of 60%.

Comparative Example 2

The raw materials (except the antioxidant) provided in Example 1 were taken to prepare a lycopene colorant by referring to the method disclosed in Example 1 of Chinese Patent Document No. CN1053949A.

The preparation method specifically comprises the following steps:
(1) emulsifiers (sucrose monostearate and phospholipid) were added into water and dissolved under stirring at 40° C., then a lycopene crystal was added, and stirred and mixed for 30 min in a mixing emulsifying machine under high shearing at 1,300 rpm until the mixture was uniform;
(2) glycerol was heated to 50° C., stirred for 20 min, and added into the mixture obtained from step (1), and the resultant material was homogenized for three times at 20 MPa; and
(3) the homogenized material was transferred to a degassing tank, degassed and aged for 6 h under −10 KPa at 45° C., to obtain the lycopene colorant.

Testing results show that the $D_{50}$ of the lycopene food colorant provided in the present Comparative Example is 1.9 µm; the tone values are L*49, a*20, and b*8, respectively; and the viscosity of the colorant is 16,000 mPa·s at a temperature of 25° C. and a relative humidity of 60%.

Example 4

The present example provides a crab stick processed using the lycopene colorant provided in Example 1. The specific processing method is as follows: 5 g of the lycopene colorant was diluted by 10 times (that is, diluted to 50 g) with pure water, and evenly sprayed on the surface of 1 kg of the crab stick.

Experimental Example

The crab stick processed by using the lycopene colorant provided by the present invention was subjected to fresh-keeping and water retention experiments.

Experimental group: the crab sticks provided in Example 4 which were processed with the lycopene colorant provided in Example 1.

Control group: 50 g of purified water was taken and evenly sprayed on the surface of 1 kg of the crab sticks.

The crab sticks provided by the experimental group and the control group were placed in a stability test box (with a temperature of 25° C., and a relative humidity of 60%) for fresh-keeping and water retention experiments, the microorganisms and moisture of the crab sticks were detected after being kept for different time periods, and the results are shown in Table 1.

TABLE 1

Detection results of microorganisms and moisture retention rates of crab sticks after standing for different time periods

| Time | Experimental group | | | Control group | | |
| --- | --- | --- | --- | --- | --- | --- |
| | Total number of colonies (cfu/g) | Moisture (%) | Moisture retention rate (%) | Total number of colonies (cfu/g) | Moisture (%) | Moisture retention rate (%) |
| Original | <10 | 4.50 | 100 | <10 | 4.50 | 100 |
| Day 3 | <10 | 4.42 | 98.22 | 50 | 4.20 | 93.33 |
| Day 6 | <10 | 4.33 | 96.22 | 300 | 3.84 | 85.33 |
| Day 9 | 50 | 4.21 | 93.56 | 2000 | 3.44 | 76.44 |

It can be seen from the results shown in Table 1 that the lycopene colorant of the present invention has a good fresh-keeping and water retention effect. In addition, the crab sticks provided by the experimental group still maintained a bright appearance after being kept in the stability test box for 9 days.

The above Examples are only preferred examples of the present invention and are not intended to limit the present invention. Any modification, equivalent replacement, improvement and the like made within the spirit and principle of the present invention should be included within the scope of protection of the present invention.

We claim:

1. A lycopene food colorant having a fresh-keeping function, wherein the food colorant is prepared from raw materials comprising the following components: 1 to 3 parts of a lycopene crystal, 5 to 20 parts of an emulsifier, 0.5 to 5 parts of an antioxidant, 60 to 70 parts of glycerol, and 10 to 20 parts of water, based on parts by weight.

2. The food colorant according to claim 1, wherein the emulsifier is obtained by mixing an oil-soluble emulsifier with a water-soluble emulsifier, at a mass ratio of (1-5):(5-15).

3. The food colorant according to claim 2, wherein the water-soluble emulsifier is one or more selected from polysorbate, sucrose monostearate, and sucrose monopalmitate; and/or, the oil-soluble emulsifier is phospholipid.

4. The food colorant according to claim 1, wherein the antioxidant is one or more selected from L-ascorbic acid, tea polyphenol, and vitamin E.

5. The food colorant according to claim 1, wherein the raw materials consist of the following components: 1% to 3% of a lycopene crystal, 1% to 5% of an oil-soluble emulsifier, 5% to 15% of a water-soluble emulsifier, 0.5% to 5% of an antioxidant, 60% to 70% of glycerol, and water in balance, based on mass percentage.

6. The food colorant according to claim 1, wherein the $D_{50}$ of the food colorant is 0.55 to 0.65 μm; and/or
the tone values of the food colorant are L*25 to 35, a*30 to 35, and b*20 to 25; and/or
the viscosity of the food colorant is 20,000 to 40,000 mPa·s at a temperature of 25° C. and a relative humidity of 60%.

7. The food colorant according to claim 1, wherein the raw materials are mixed, emulsified, and then ground.

8. The food colorant according to claim 7, wherein the emulsification is carried out at 45° C. to 75° C., carried out by shear emulsification at 6,000 to 8,000 rpm for 15 to 45 min.

9. The food colorant according to claim 7, wherein the grinding is carried out at a temperature of 40° C. to 60° C., at a linear speed of 8 to 15 m/s for 120 to 150 min.

10. The food colorant according to claim 2, wherein the raw materials consist of the following components: 1% to 3% of a lycopene crystal, 1% to 5% of an oil-soluble emulsifier, 5% to 15% of a water-soluble emulsifier, 0.5% to 5% of an antioxidant, 60% to 70% of glycerol, and water in balance, based on mass percentage.

11. The food colorant according to claim 3, wherein the raw materials consist of the following components: 1% to 3% of a lycopene crystal, 1% to 5% of an oil-soluble emulsifier, 5% to 15% of a water-soluble emulsifier, 0.5% to 5% of an antioxidant, 60% to 70% of glycerol, and water in balance, based on mass percentage.

12. The food colorant according to claim 4, wherein the raw materials consist of the following components: 1% to 3% of a lycopene crystal, 1% to 5% of an oil-soluble emulsifier, 5% to 15% of a water-soluble emulsifier, 0.5% to 5% of an antioxidant, 60% to 70% of glycerol, and water in balance, based on mass percentage.

13. The food colorant according to claim 2, wherein the $D_{50}$ of the food colorant is 0.55 to 0.65 μm; and/or
the tone values of the food colorant are L*25 to 35, a*30 to 35, and b*20 to 25; and/or
the viscosity of the food colorant is 20,000 to 40,000 mPa·s at a temperature of 25° C. and a relative humidity of 60%.

14. The food colorant according to claim 3, wherein the $D_{50}$ of the food colorant is 0.55 to 0.65 μm; and/or
the tone values of the food colorant are L*25 to 35, a*30 to 35, and b*20 to 25; and/or
the viscosity of the food colorant is 20,000 to 40,000 mPa·s at a temperature of 25° C. and a relative humidity of 60%.

15. The food colorant according to claim 4, wherein the $D_{50}$ of the food colorant is 0.55 to 0.65 μm; and/or
the tone values of the food colorant are L*25 to 35, a*30 to 35, and b*20 to 25; and/or
the viscosity of the food colorant is 20,000 to 40,000 mPa·s at a temperature of 25° C. and a relative humidity of 60%.

16. The food colorant according to claim 5, wherein the $D_{50}$ of the food colorant is 0.55 to 0.65 μm; and/or
the tone values of the food colorant are L*25 to 35, a*30 to 35, and b*20 to 25; and/or
the viscosity of the food colorant is 20,000 to 40,000 mPa·s at a temperature of 25° C. and a relative humidity of 60%.

17. The food colorant according to claim 8, wherein the grinding is carried out at a temperature of 40° C. to 60° C., at a linear speed of 8 to 15 m/s for 120 to 150 min.

18. A preparation method of a minced fillet food using the lycopene colorant according to claim 1, wherein, the lycopene colorant according to claim 1 is diluted and sprayed on the surface of the minced fillet food.

\* \* \* \* \*